US005312656A

United States Patent [19]

Michaels

[11] Patent Number: 5,312,656

[45] Date of Patent: May 17, 1994

[54] TOY PICNIC SET HAVING LATENT IMAGE PLACEMAT

[75] Inventor: James Michaels, Redondo Beach, Calif.

[73] Assignee: Mattel, Inc., El Segundo, Calif.

[21] Appl. No.: 13,892

[22] Filed: Feb. 5, 1993

[51] Int. Cl.[5] .......... B32B 9/00

[52] U.S. Cl. .......... 428/13; 428/166; 428/187; 428/195; 428/204; 428/206; 283/91; 283/107; 283/108; 283/109; 283/111; 283/901

[58] Field of Search .......... 428/195, 204, 206, 207, 428/166, 187, 13; 283/91, 107, 108, 109, 111, 901

[56] References Cited

U.S. PATENT DOCUMENTS

| | | | |
|---|---|---|---|
| 1,422,527 | 7/1922 | Berger | 359/464 |
| 2,158,633 | 5/1939 | Normandi et al. | 428/187 |
| 3,097,782 | 7/1963 | Koropatkin et al. | 229/103 |
| 3,508,344 | 4/1970 | Thomas | 434/327 |
| 3,675,948 | 7/1972 | Wicker | 283/67 |
| 3,802,101 | 4/1974 | Scantlin | 287/87 |
| 4,298,217 | 11/1981 | Moran et al. | 283/108 |
| 4,337,812 | 7/1982 | Trinkner | 383/4 |
| 4,484,797 | 11/1984 | Knop et al. | 283/91 |
| 4,499,999 | 2/1985 | Behar | 206/546 |
| 4,626,445 | 12/1986 | Dobrowolski et al. | 427/7 |
| 4,738,888 | 4/1988 | Pantaleo et al. | 428/13 |
| 4,796,921 | 1/1989 | Neiman | 428/203 |
| 4,915,232 | 4/1990 | Hill et al. | 206/541 |
| 4,993,753 | 2/1991 | Weeks | 283/102 |
| 5,047,267 | 9/1991 | Pantaleo et al. | 428/13 |
| 5,104,699 | 4/1992 | Pantaleo et al. | 428/13 |

*Primary Examiner*—Patrick J. Ryan
*Assistant Examiner*—Abraham Bahta
*Attorney, Agent, or Firm*—Roy A. Ekstrand

[57] ABSTRACT

A placemat defining a translucent upper surface supporting a red/yellow obscuring design; a plate formed of a transparent red material; and a latent image formed on the placemat obscured by the red/yellow design, the plate being placed upon the placemat overlying the latent image to filter out the obscuring design and reveal the latent image.

1 Claim, 1 Drawing Sheet

TOY PICNIC SET HAVING LATENT IMAGE PLACEMAT

FIELD OF THE INVENTION

This invention relates generally to toy cooking and utensil sets and particularly to toy picnic sets.

BACKGROUND OF THE INVENTION

A great number of toy kitchen utensil and cooking sets have been provided in which a plurality of dishes and pots and pans as well as associated implements are provided in miniature form for the child user. In addition, picnic sets having a plurality of toy dishes, cups, glasses and utensils have also become well known in the art. There remains, however, a continuing need in the art for evermore improved, interesting and unusual toy picnic sets.

SUMMARY OF THE INVENTION

Accordingly, it is a general object of the present invention to provide an improved toy picnic set. It is a more particular object of the present invention to provide an improved toy picnic set which adds additional interest and amusement.

In accordance with the present invention, there is provided a toy picnic set comprises: a placemat defining a translucent upper surface supporting a red/yellow obscuring design; a plate formed of a transparent red material; and a latent image formed on the placemat obscured by the red/yellow design, the plate being placed upon the placemat overlying the latent image to filter out the obscuring design and reveal the latent image.

BRIEF DESCRIPTION OF THE DRAWING

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
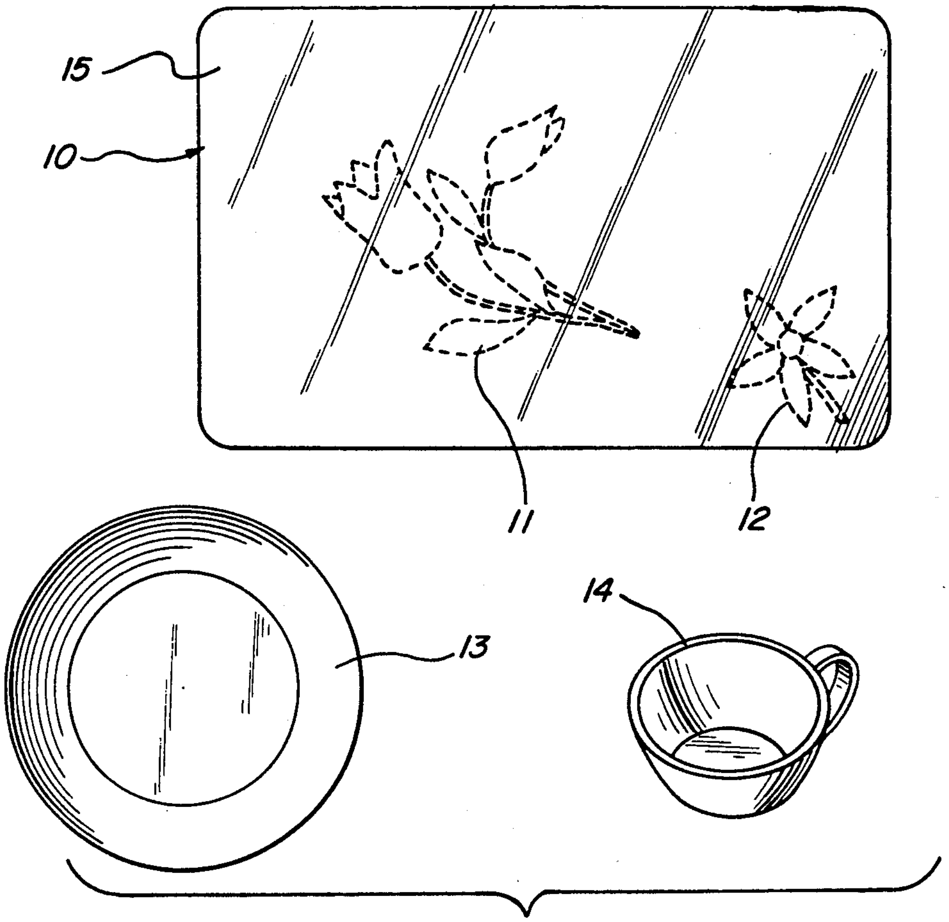
FIG. 1 sets forth a top view of a toy picnic set constructed in accordance with the present invention.

FIG. 1 sets forth a top view of a toy picnic set constructed in accordance with the present invention. A placemat 10 comprises a generally planar rectangular member defining a translucent top surface 15. In accordance with an important aspect of the present invention, placemat 10 further defines a plurality of latent images 11 and 12 formed beneath surface 15. Latent images 11 and 12 are hidden by a red and yellow design pattern printed upon top surface 15. Thus, latent images 11 and 12 are not visible upon placemat 10 in the full exposed position shown in FIG. 1. A plate 13 and a cup 14 are fabricated of a transparent red tinted plastic material in which the red color tinting corresponds to the red color in the obscuring red/yellow design of top surface 15 of placemat 10.

Figure 2:
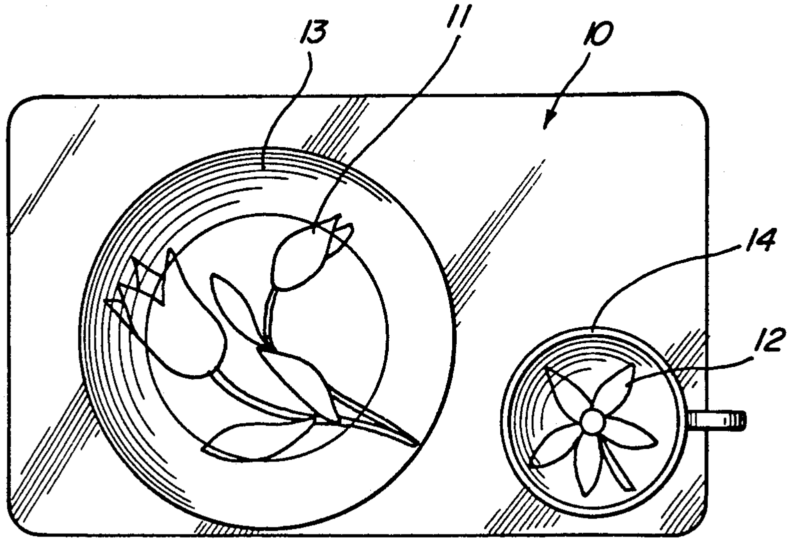
FIG. 2 sets forth a top view of the present invention toy picnic set displaying the latent image revelation.

FIG. 2 sets forth the present invention picnic set in which plate 13 and cup 14 have been placed upon placemat 10 overlying latent images 11 and 12. In accordance with an important aspect of the present invention, the filtering action of red tinted plate 13 operates upon the red/yellow obscuring design of placemat 10 to reveal image 11 beneath plate 13. Similarly, the red tint of cup 14 operates upon the red/yellow obscuring design of placemat 10 to reveal latent image 12.

As a result of the present invention, a toy picnic set is provided which includes playsets and utensils such as plates and cup in which normal play pattern may be undertaken. In accordance with an additional amusement value of the present invention toy picnic set, a plurality of latent images are hidden beneath an obscuring red/yellow pattern upon the placemat and are revealed only after a red tinted plate or cup has been placed upon the placemat. This provides a substantial improvement in the entertainment value of the picnic set beyond its normal use.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A toy picnic set comprising:

a placemat defining a translucent upper surface supporting a red/yellow obscuring design;

a plate formed of a transparent red material; and a latent image formed on said placemat obscured by said red/yellow design, said plate being placed upon said placemat overlying said latent image to filter out said obscuring design and reveal said latent image.

* * * * *